(12) United States Patent
Cai et al.

(10) Patent No.: US 11,839,002 B2
(45) Date of Patent: Dec. 5, 2023

(54) CONTROL CIRCUIT FOR CONSTANT-CURRENT DRIVE CIRCUIT AND CONSTANT-CURRENT DRIVE CIRCUIT

(71) Applicant: SHANGHAI BRIGHT POWER SEMICONDUCTOR CO., LTD., Shanghai (CN)

(72) Inventors: Xiaohui Cai, Shanghai (CN); Shungen Sun, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 1 day.

(21) Appl. No.: 17/875,140

(22) Filed: Jul. 27, 2022

(65) Prior Publication Data

US 2023/0034590 A1 Feb. 2, 2023

(30) Foreign Application Priority Data

Jul. 28, 2021 (CN) .......................... 202110867841.2

(51) Int. Cl.
H05B 45/345 (2020.01)
H05B 45/375 (2020.01)

(52) U.S. Cl.
CPC ......... *H05B 45/345* (2020.01); *H05B 45/375* (2020.01)

(58) Field of Classification Search
CPC .. H05B 45/345; H05B 45/375; H05B 45/335; H05B 45/392; H05B 45/10; H05B 45/30;
(Continued)

(56) References Cited

U.S. PATENT DOCUMENTS

2012/0049753 A1* 3/2012 Hwang ................ H05B 45/375
315/224
2014/0015440 A1* 1/2014 Yu .......................... H05B 45/60
315/294

(Continued)

FOREIGN PATENT DOCUMENTS

CN 102088808 A 6/2011
CN 103248227 A 8/2013
(Continued)

*Primary Examiner* — Abdullah A Riyami
*Assistant Examiner* — Syed M Kaiser
(74) *Attorney, Agent, or Firm* — Muncy, Geissler, Olds & Lowe, P.C.

(57) ABSTRACT

A control circuit for a constant-current drive circuit, as well as a constant-current drive circuit are disclosed. The control circuit can obtain output information of the constant-current drive circuit and use it in combination with reference information to determine, according to an output condition corresponding to the current load of the constant-current drive circuit, a time point for the system to enter or exit a rapid drive mode. Therefore, it can be suitably used in various application scenarios to determine a time point for the system to entry into or exit from the rapid start mode. Compared with fast charging for a fixed period of time as used in the prior art, embodiments of the present invention can effectively overcome the problem of easy overshooting or inadequate acceleration during start as found in various applications.

16 Claims, 4 Drawing Sheets

(58) Field of Classification Search
CPC .... H05B 45/315; H05B 47/16; H05B 47/165; Y02B 20/40
See application file for complete search history.

(56) References Cited

U.S. PATENT DOCUMENTS

| | | | | |
|---|---|---|---|---|
| 2015/0334796 | A1* | 11/2015 | Reiter | H05B 45/10 |
| | | | | 315/224 |
| 2020/0097035 | A1* | 3/2020 | Sano | H03F 3/345 |
| 2021/0099090 | A1* | 4/2021 | Yang | H02M 3/33523 |

FOREIGN PATENT DOCUMENTS

| | | | | |
|---|---|---|---|---|
| CN | 103458586 | A | 12/2013 | |
| CN | 106131999 | A | 11/2016 | |
| CN | 110515414 | A | 11/2019 | |
| CN | 112235903 | A | 1/2021 | |
| CN | 112469165 | A | 3/2021 | |
| EP | 3793328 | A1 | 3/2021 | |
| WO | WO-2021127957 | A1 * | 7/2021 | ........ H02M 3/33507 |

* cited by examiner

CONTROL CIRCUIT FOR CONSTANT-CURRENT DRIVE CIRCUIT AND CONSTANT-CURRENT DRIVE CIRCUIT

CROSS-REFERENCES TO RELATED APPLICATIONS

This application claims the priority of Chinese patent application number 202110867841.2, filed on Jul. 28, 2021, the entire contents of which are incorporated herein by reference.

TECHNICAL FIELD

The present invention relates to the field of power electronics technology and, in particular, to a control circuit for a constant-current drive circuit and a constant-current drive circuit.

BACKGROUND

During the use of existing power supplies for dimming or like functions, they are typically required to provide an output current with insignificant fluctuations. To this end, a large output capacitor is typically added to the output terminal of the power supply. However, just due to the large output capacitor, after being powered up, the system would take a long time to reach a constant current. That is, it starts slowly. In applications with multiple parallel lamps, this may lead to the lamps being lighted up successively but not simultaneously. In particular, in applications with dimming, as the low duty cycle will slows down charging of the output capacitor, the start time would be even extended, leading to longer time intervals between successive lighting up of lamps in applications with multiple parallel lamps.

In order to overcome the above problems, rapid start techniques are employed nowadays. That is, after the system is powered up, the output capacitor is charged at an accelerated rate for a fixed period of time. After elapse of this period, the system is switched back to normal loop control. However, due to the accomplishment of rapid start within a fixed period of time, existing rapid start techniques suffer from problems with various degrees of severity in different applications and under different input and output conditions. In particular, under full-load and high-voltage input conditions, overshooting, or even extremely severe overshooting may occur. Moreover, in some cases with input of both high and low voltages (for example, the high voltage is about 220 vac, the low voltage is about 120 vac) or with great dimming depths, the problem of inadequate acceleration during start will occur.

SUMMARY OF THE INVENTION

It is an object of the present invention to solve the problem of easy overshooting or inadequate acceleration during start associated with the existing rapid start techniques by providing a control circuit for a constant-current drive circuit.

To this end, the provided control circuit for a constant-current drive circuit includes:
an output information detection module coupled to an output terminal of the constant-current drive circuit and adapted to detect output information at the output terminal of the constant-current drive circuit;
a reference information generation module coupled to an output current sampling terminal of the constant-current drive circuit and adapted to generate reference information based on a sampled peak output current of the constant-current drive circuit;
a rapid start signal generation module having an input terminal coupled to output terminals of the output information detection module and the reference information generation module and adapted to receive the output information and the reference information and generate a rapid start signal configured to indicate whether it enters into a rapid start phase or exits from a rapid start phase; and
a control signal generation module having an input terminal coupled to an output terminal of the rapid start signal generation module and configured to receive the rapid start signal and generate a control signal according to the rapid start signal, the control signal adapted to control a power switching transistor in the constant-current drive circuit to drive a load.

Optionally, the output information detection module may be an inductor demagnetization detection module adapted to detect a demagnetization time of an inductor in the constant-current drive circuit.

Optionally, the reference information may be a reference time which characterizes a period of time taken to charge a reference timing capacitor with a predetermined reference current until a voltage at a capacitive node of the reference timing capacitor reaches a sampled peak voltage of the constant-current drive circuit,
where if the demagnetization time ends later than the ending point of the reference time, the rapid start signal generation module continues generating the rapid start signal, or if the demagnetization time ends earlier than the ending point of the reference time, the rapid start signal generation module inverts the level of the rapid start signal and causes exit from the rapid start phase at the ending point of the demagnetization time.

Optionally, the rapid start signal generation module may include:
an AND gate having two input terminals coupled respectively to the output terminal of the output information detection module and the output terminal of the reference information generation module; and
a latch, the latch having an input terminal coupled to an output terminal of the AND gate, an output terminal of the latch outputs the rapid start signal.

Optionally, the reference information generation module may include:
a reference current source, the reference current source coupled to a reference resistor and configured to generate a reference current corresponding to the reference resistor, the reference current source having an output terminal coupled to a reference timing capacitor and configured to charge the reference timing capacitor;
a sample-and-hold circuit having an input terminal coupled to the output current sampling terminal of the constant-current drive circuit and adapted to generate the sampled peak output current;
a first comparator, the first comparator having a negative terminal coupled to a capacitive node of the reference timing capacitor, the first comparator having a positive terminal coupled to an output terminal of the sample-and-hold circuit and adapted to output comparison information;
an inverter having an input terminal coupled to an output terminal of the first comparator and configured to invert the comparison information from the first comparator and output the inverted information; and a NOR gate, the NOR gate having a first input terminal coupled to an output terminal of the inverter, the NOR gate having a second input terminal configured to receive a current control signal from the control circuit and output the reference information.

Optionally, the reference information generation module may further include a switching transistor having a source coupled to the capacitive node of the reference timing capacitor, a grounded drain and a gate coupled to an output terminal of the control signal generation module and configured to receive the control signal.

Optionally, the control signal generation module may be configured to receive the rapid start signal and a dimming or speed regulation signal and generate a constant-current reference voltage, which is output with a duty cycle of 100% if the received rapid start signal indicates entry into the rapid start phase, or with a duty cycle depending on a duty cycle of the dimming or speed regulation signal if the received rapid start signal indicates exit from the rapid start phase.

Optionally, the control signal generation module may include:
- a constant-current reference voltage generation module having an input terminal adapted to receive the reference voltage and the dimming or speed regulation signal and generate the constant-current reference voltage;
- a sampling algorithm module having an input terminal coupled to the output current sampling terminal of the constant-current drive circuit and adapted to generate a sampled output current;
- a loop control circuit coupled to an output terminal of the constant-current reference voltage generation module and an output terminal of the sampling algorithm module; and
- a switch on-time modulator having an input terminal coupled to an output terminal of the loop control circuit and adapted to modulate and generate a switch on-time in a switching period according to output information from the loop control circuit.

Optionally, the constant-current reference voltage generation module may include:
- a first inverter, the first inverter having an input terminal configured to receive the rapid start signal which indicates entry into the rapid start phase when the rapid start signal is a low level and indicates exit from the rapid start phase when the rapid start signal is a high level;
- an OR gate, the OR gate having a first input terminal adapted to receive the dimming or speed regulation signal, the OR gate having a second input terminal coupled to an output terminal of the first inverter, the OR gate having an output terminal coupled to a first switch so as to be able to turn the first switch on or off, and
- a second inverter, the second inverter having an input terminal coupled to the output terminal of the OR gate, the second inverter having an output terminal coupled to a second switch so as to be able to turn the second switch on or off,
wherein two terminals of the first switch are coupled respectively to an input terminal of a reference voltage and the output terminal of the constant-current reference voltage generation module, and two terminals of the second switch are respectively grounded and coupled to the output terminal of the constant-current reference voltage generation module.

Optionally, the sampling algorithm module may be further configured to receive the rapid start signal, wherein when the received rapid start signal indicates entry into the rapid start phase, a sampled output voltage corresponding to the sampled output current is a low level.

Optionally, the loop control circuit may be further configured to receive the rapid start signal and output a first signal if the received rapid start signal indicates entry into the rapid start phase, or output a second signal if the received rapid start signal indicates exit from the rapid start phase, wherein the switch on-time in a switching period modulated and generated by the switch on-time modulator according to the first signal is higher than the switch on-time in a switching period modulated and generated by the switch on-time modulator according to the second signal.

Optionally, the loop control circuit may include:
- an error amplifier, the error amplifier having a positive terminal adapted to receive the constant-current reference voltage, the error amplifier having a negative terminal adapted to receive the sampled output voltage corresponding to the sampled output current, the error amplifier having an output terminal coupled to an output node;
- a filtering capacitor, the filtering capacitor having a first terminal coupled to the output node, the filtering capacitor having a grounded second terminal; and
- a comparator circuit, the comparator circuit having an input terminal coupled to the output node, the comparator circuit having an output terminal coupled to the input terminal of the switch on-time modulator.

Optionally, the error amplifier may be further adapted to receive the rapid start signal, wherein when the received rapid start signal indicates entry into the rapid start phase, an equivalent gain of the error amplifier is increased, or an equivalent capacitance of the filtering capacitor is reduced, so that accelerated variation is created at the output node and the first signal is output by the comparator circuit.

Optionally, the switch on-time modulator may be further adapted to receive the rapid start signal, wherein when the received rapid start signal indicates entry into the rapid start phase, the switch on-time is increased, or a switch off-time is reduced.

It is another object of the present invention to provide a constant-current drive circuit including a main circuit and the control circuit as defined above.

Optionally, the main circuit may be a buck circuit or a boost circuit.

In the control circuit for a constant-current drive circuit provided in the present invention, the rapid start signal generation module obtains output information of the constant-current drive circuit and uses it in combination with reference information to determine, according to an output condition corresponding to the current load of the constant-current drive circuit, a time point for the system to enter into or exit from a rapid drive mode. In particular, the reference information may be generated according to a peak output current in the constant-current drive circuit. In this way, more targeted determination of a time point for the system to entry into or exit from the rapid start mode can be achieved in particular application scenarios. Compared with fast charging for a fixed period of time as used in the prior art, embodiments of the present invention can effectively overcome the problem of easy overshooting or inadequate acceleration during start as found in various applications.

DETAILED DESCRIPTION

The core idea of the present invention is to provide a control circuit for a constant-current drive circuit, which is adapted to control an on-off state of a power switching transistor Mo in the constant-current drive circuit. Specifically, the drive circuit is able to determine a time point for the constant-current drive circuit to enter into or exit from a rapid start mode in various particular application scenarios (e.g., particular LED load conditions). Compared with operation in the rapid start mode for fast charging for a fixed period of time, embodiments of the present invention can effectively overcome the problem of easy overshooting in various applications, in particular under full-load and high-voltage input conditions.

The constant-current drive circuit and control circuit thereof proposed in the present invention will be described in greater detail below with reference to the accompanying drawings and specific embodiments. From the following description, advantages and features of the present invention will become more apparent. Note that the drawings are provided in a very simplified form not necessarily drawn to exact scale for the only purpose of helping to explain the disclosed examples in a more convenient and clearer way.

Figure 1:
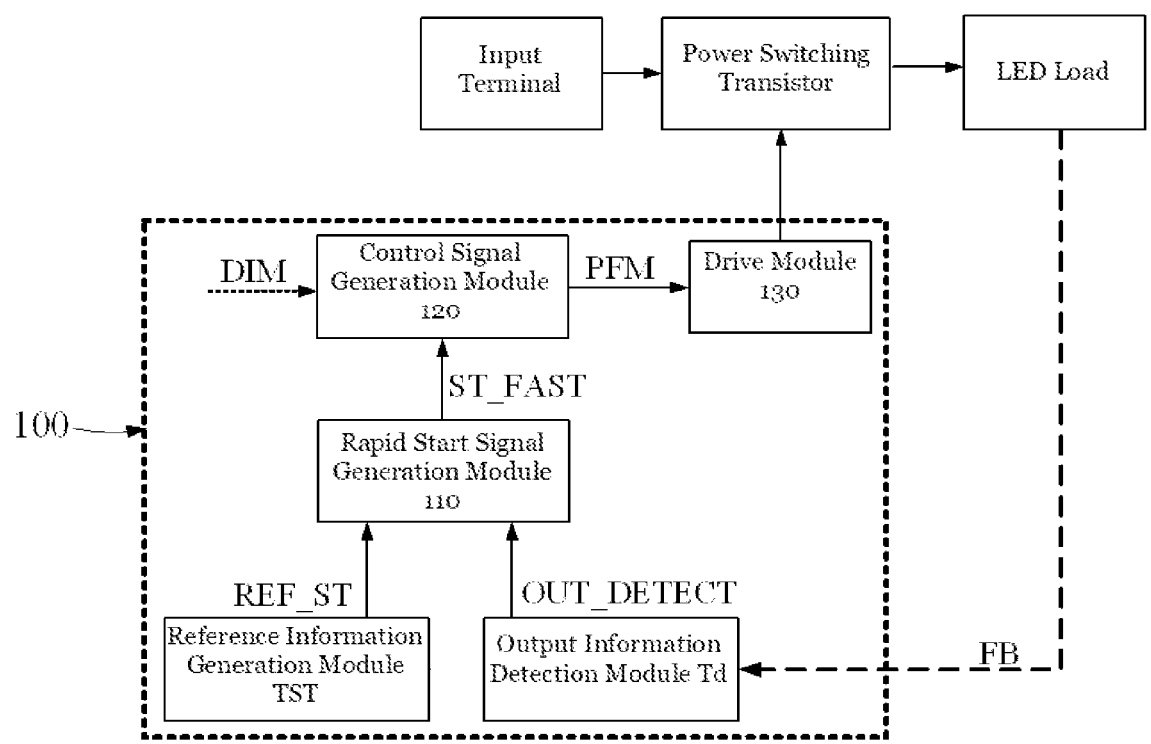
FIG. 1 is a schematic diagram illustrating the structure of a constant-current drive circuit and a control circuit thereof according to an embodiment of the present invention.
Figure 2:
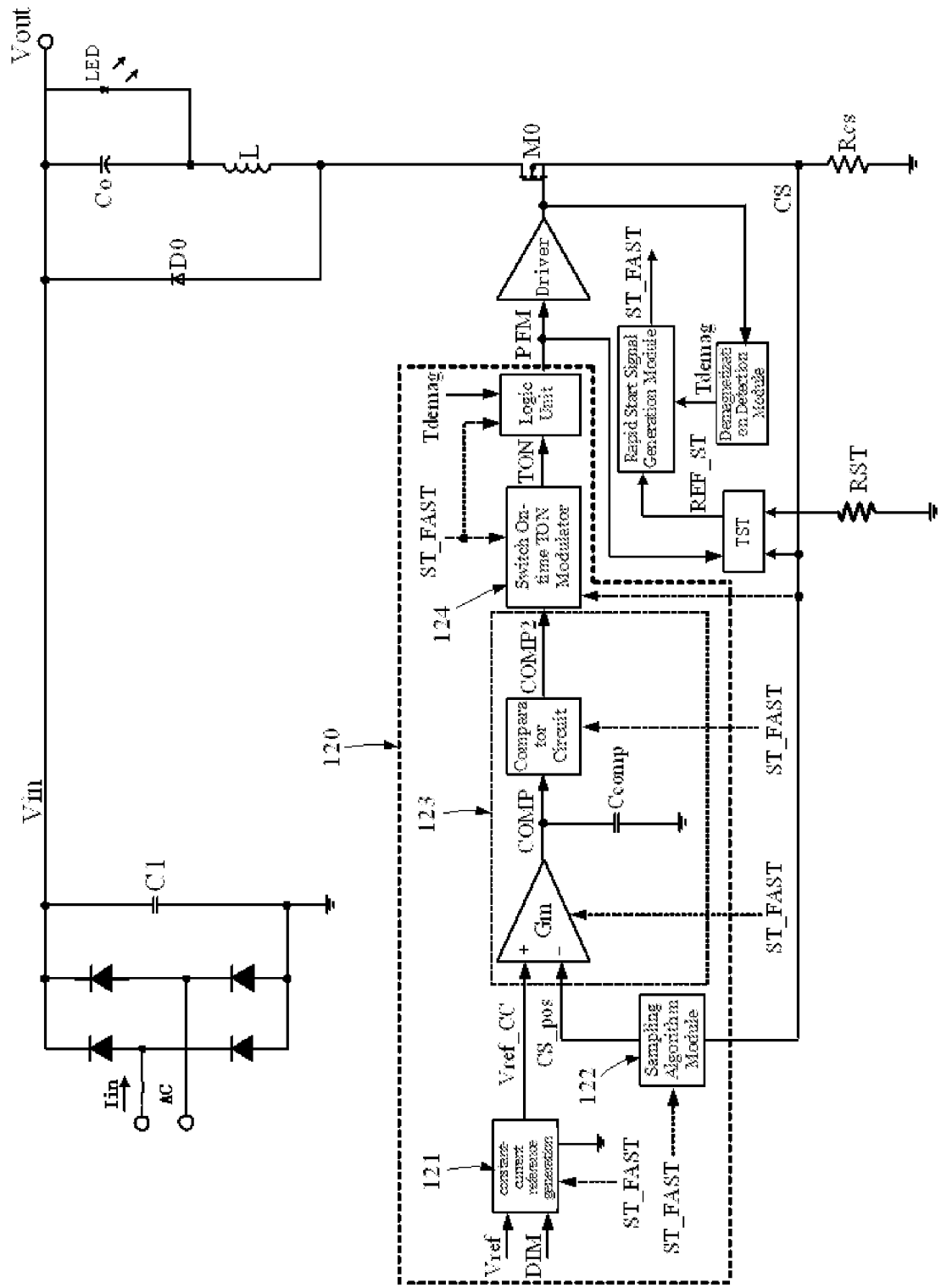
FIG. 2 is an equivalent circuit diagram of the constant-current drive circuit and the control circuit thereof according to an embodiment of the present invention.

FIG. 1 is a schematic diagram illustrating the structure of a constant-current drive circuit according to an embodiment of the present invention, and FIG. 2 is an equivalent circuit diagram of the constant-current drive circuit according to an embodiment of the present invention. With combined reference to FIGS. 1 and 2, the constant-current drive circuit includes a control circuit 100, which is adapted to generate a drive and control logic signal to control an on-off state of a power switching transistor Mo in the constant-current drive circuit. Specifically, the control circuit 100 determines a time point for the constant-current drive circuit to enter into or exit from a rapid start mode according to output feedback FB from an output terminal of the constant-current drive circuit, and it is suitable for use in various constant-current drive applications. The output feedback FB can directly or indirectly reflect an actual load condition at the output terminal of the constant-current drive circuit (e.g., in case of an LED drive circuit, the output feedback FB can directly or indirectly reflect an actual LED load condition at the output terminal).

In particular, referring to FIGS. 1 and 2, the control circuit 100 includes a rapid start signal generation module 110 and a control signal generation module 120.

The rapid start signal generation module 110 is adapted to, based on output information OUT_DETECT (e.g., information characterizing an output voltage Vout), generate a corresponding rapid start signal ST_FAST (e.g., ST_FAST=0 means IN, while ST_FAST=1 means OUT). Thus, the rapid start signal ST_FAST is adapted to provide an indication of entry into a rapid start phase or not. Moreover, an input terminal of the control signal generation module 120 is coupled to an output terminal of the rapid start signal generation module 110 so as to be able to receive the rapid start signal ST_FAST and generate a control signal according to the rapid start signal ST_FAST. The control signal PFM is adapted to control the power switching transistor Mo in the constant-current drive circuit to drive a load.

In a particular embodiment, the control signal PFM generated by the control signal generation module 120 is additionally transmitted to a drive module 130 to control the power switching transistor Mo. In this case, an input terminal of the drive module 130 is coupled to an output terminal of the control signal generation module 120 to receive the control signal PFM. Moreover, an output terminal of the drive module 130 is coupled to the power switching transistor Mo in the constant-current drive circuit to drive switching of the power switching transistor Mo.

Specifically, when the output information OUT_DETECT is lower than a given comparison value, the rapid start signal generation module 110 generates a rapid start signal (e.g., ST_FAST=0) which indicates entry into the rapid start mode where a current exceeding an output current Iout in a normal operating mode is generated to accelerate charging of an output capacitor Co through increasing a duty cycle of the constant-current drive circuit (e.g., by extending an on-time TON of the power switching transistor Mo or shortening its off-time TOFF), raising a sampled peak voltage Vcs_pk, speeding up loop response, or otherwise. Moreover, when the output information OUT_DETECT is higher than a given comparison value, the rapid start signal generation module 110 generates a rapid start signal (e.g., ST_FAST=1) which indicates exit from the rapid start mode and return to the normal operating mode. In this way, targeted choice of a time point for entry into or exit from the rapid start mode in different application scenarios is achieved. Compared with entry into or exit from the rapid start mode at a fixed time point, this embodiment can effectively circumvent the problem of easy overshooting or insufficient acceleration in various application scenarios and avoid successive start in applications with multiple parallel loads.

Further, the rapid start signal generation module 110 specifically determines a time point for the constant-current drive circuit to enter into or exit from the rapid start mode based on a comparison between the output information OUT_DETECT and reference information REF_ST. The rapid start signal generation module 110 in the present embodiment will be described in greater detail below with reference to FIG. 3, which is an equivalent circuit diagram of the rapid start signal generation module.

Figure 3:
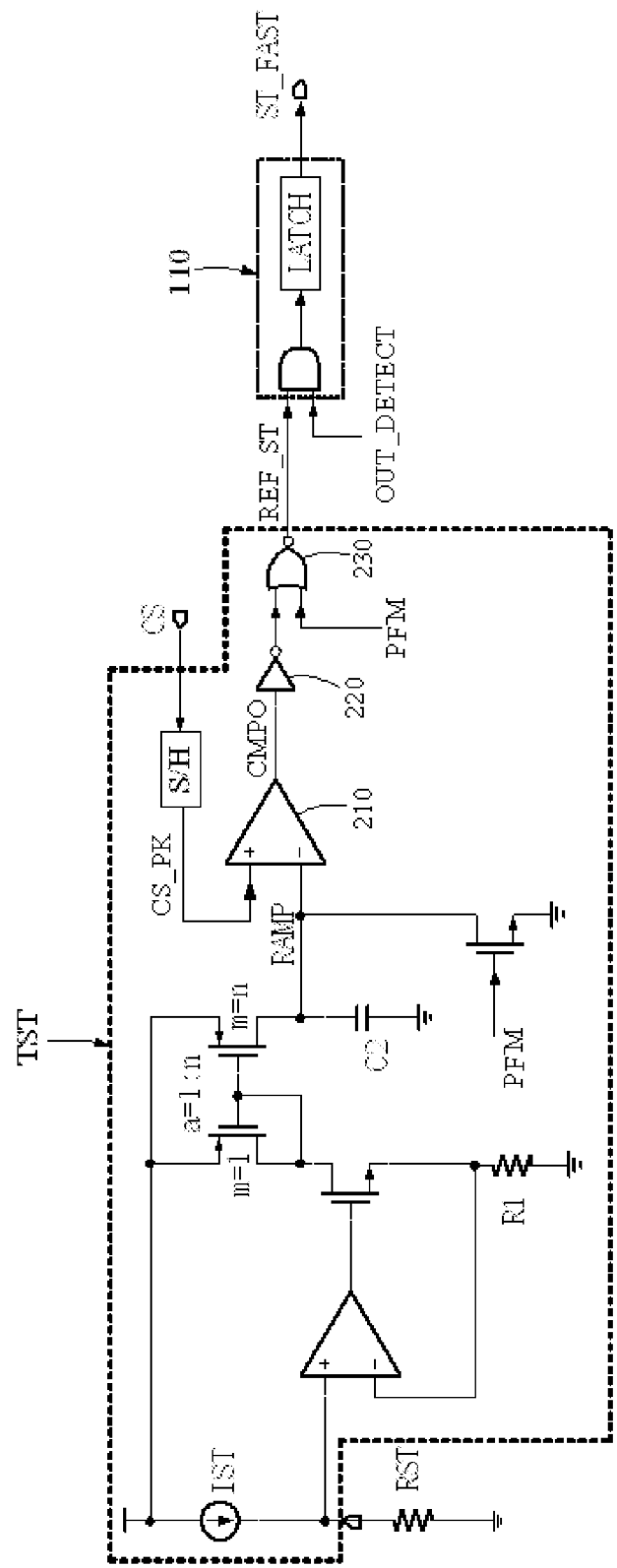
FIG. 3 is an equivalent circuit diagram of a rapid start signal generation module and a reference information generation module according to an embodiment of the present invention.

With particular reference to FIG. 3, the rapid start signal generation module 110 includes an AND gate and a latch LATCH. The AND gate has two input terminals for respectively receiving the output information OUT_DETECT and the reference information REF_ST and an output terminal for outputting the comparison information. The output terminal of the AND gate is coupled to an input terminal of the latch LATCH. The AND gate transmits the comparison information to the latch LATCH. The latch LATCH latches the comparison information from the AND gate and then outputs a rapid start signal ST_FAST.

The output information OUT_DETECT is adapted to directly or indirectly characterize an output voltage Vout at the output terminal. In a particular embodiment, the output voltage Vout can be reflected by a demagnetization time Tdemag of an inductor L. For example, the detected demagnetization time Tdemag of the inductor L can be directly taken as the output information OUT_DETECT. Alternatively, the output voltage Vout may be calculated from the detected demagnetization time Tdemag and taken as the output information OUT_DETECT.

Specifically, the demagnetization time of the inductor L is calculated according to:

$$Tdemag=Lm*Ics\_pk/Vout=Lm*Vcs\_pk/(Rcs*Vout),$$

where Tdemag is the demagnetization time of the inductor in the constant-current drive circuit;

Lm is an inductance of the inductor;

Ics_pk is a peak current flowing through a sampling resistor, which, in case of an applied circuit with a high power factor, varies with a sine wave envelope within one power cycle;

Vcs_pk is a sampled peak voltage corresponding to the peak current flowing through the sampling resistor;

Rcs is a resistance of the sampling resistor; and

Vout is the output voltage of the constant-current drive circuit.

Therefore, in an applied circuit with a high power factor, if the sampled peak voltage Vcs_pk and the demagnetization time Tdemag are gained, the output voltage Vout in the current switching cycle can be accurately get.

Additionally, the output information OUT_DETECT is detected by an output information detection module Td. An output terminal of the output information detection module Td is coupled to the rapid start signal generation module 110. The output information detection module Td transmits the detected output information OUT_DETECT to the rapid start signal generation module 110. In this embodiment, the output information detection module Td is an inductor demagnetization detection module for detecting a demagnetization time of the inductor L in the constant-current drive circuit. The inductor demagnetization detection module can directly compare the demagnetization time Tdemag of the inductor L with a reference time of the corresponding switching cycle. Within the demagnetization time Tdemag of the inductor L, the output information OUT_DETECT is a high level.

With continued reference to FIGS. 1 to 3, the reference information REF_ST can be generated by a reference information generation module TST. Specifically, the reference information generation module TST includes a reference current source, a sample-and-hold circuit H/S, a first comparator 210, an inverter 220 and a NOR gate 230.

An output terminal of the reference current source is coupled to a first terminal of a reference timing capacitor C2, and a capacitive node RAMP corresponding to the first terminal of the reference timing capacitor C2 is coupled to a negative terminal of the first comparator 210. When the power transistor Mo is turned off, the reference current source provides a reference current for charging the reference timing capacitor C2 and thus pulling up a voltage at the capacitive node RAMP within a period of time.

Specifically, the reference current source is coupled to a reference resistor which can converted a corresponding to reference current. The reference resistor RST can be adjusted according to a particular load condition of the constant-current drive circuit (in particular, according to an LED load of the LED drive circuit) so as to modulate the reference current by adjusting the reference resistor RST.

With continued reference to FIG. 3, an input terminal of the sample-and-hold circuit H/S is coupled to a sampling terminal CS of the constant-current drive circuit for receiving a signal of the sampling terminal CS and generating a sampled peak output current cs_pk. An output terminal of the sample-and-hold circuit H/S is coupled to a positive terminal of the first comparator 210. Specifically, the input terminal of the sample-and-hold circuit H/S is coupled to sampling resistor Rcs of the constant-current drive circuit. A first terminal of the sampling resistor Rcs is coupled to a drain of the power switching transistor Mo, and a second terminal of the sampling resistor Rcs is grounded. The sampled peak output current cs_pk is a peak current flowing through the sampling resistor Rcs.

In addition, an output terminal of the first comparator 210 is coupled to an input terminal of the inverter 220, and an output terminal of the inverter 220 is coupled to a first input terminal of the NOR gate 230. A second input terminal of the NOR gate 230 receives the current control signal PFM of the control circuit 100.

During operation of the reference information generation module TST, the voltage at the capacitive node RAMP of the reference timing capacitor is input to the negative terminal of the first comparator 210, and at the same time, the sample-and-hold circuit H/S inputs a voltage corresponding to the sampled peak output current to the positive terminal of the first comparator 210. In response, comparison information CMPO will be output from the first comparator 210. The comparison information CMPO is inverted by the inverter 220 and then input to the first input terminal of the NOR gate 230. The NOR gate 230 further receives the control signal PFM at the second input terminal, and thus outputs the reference information REF_ST.

In the following, how the reference information generation module TST generates the reference information REF_ST in accordance with the present embodiment will be explained with reference to FIG. 4.

Figure 4:
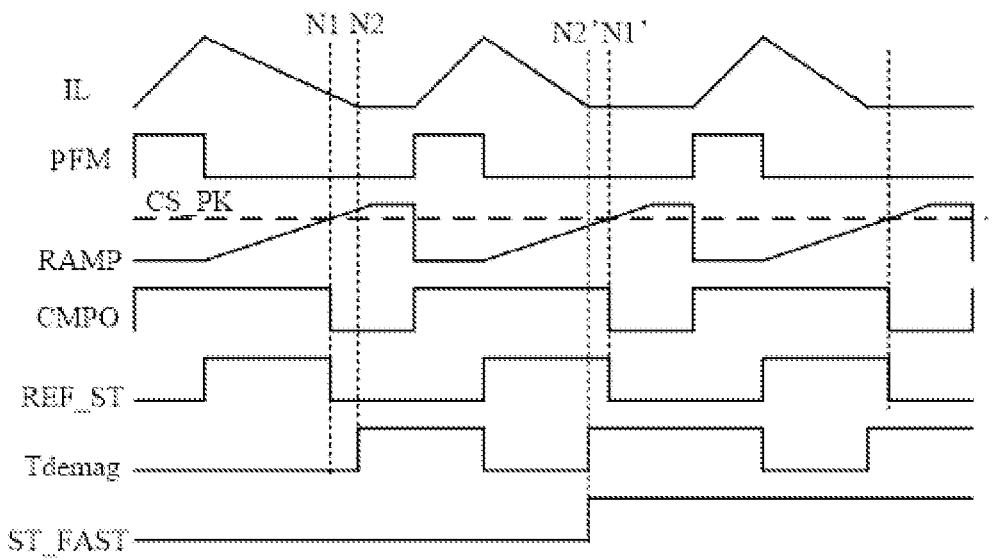
FIG. 4 is a timing diagram for entry and exit into and from a rapid start mode for the constant-current drive circuit according to an embodiment of the present invention.

As shown in FIG. 4, when the power switching transistor Mo is turned off (the inductor L is discharged, leading to a ramp-down of an inductor current IL), the reference current source charges the capacitive node RAMP and the voltage at the capacitive node RAMP ramps up but is still lower than the sampled peak voltage corresponding to the sampled peak output current. As a result, the comparison information CMPO output from the first comparator 210 is a high level. After being inverted by the inverter 220, a low level is output from the inverter 220. As a result, both the first and second input terminals of the NOR gate 230 receive a low level, and the NOR gate 230 outputs the reference information REF_ST (REF_ST=1) which is a high level.

With continued reference to FIG. 4, when the voltage at the capacitive node RAMP rises beyond the sampled peak voltage corresponding to the sampled peak output current, the comparison information CMPO output from the first comparator 210 is a low level. After being inverted by the inverter 220, a high level is output from the inverter 220. As a result, the first terminal of the NOR gate 230 receives a high level and the second input terminal of the NOR gate 230 receives a low level, and the NOR gate 230 outputs the reference information REF_ST (REF_ST=0) which is a low level.

Therefore, the reference information REF_ST in this embodiment can be regarded as a reference time which directly or indirectly characterizes a period of time taken by the set reference current to charge the reference timing capacitor C2 until the voltage Vramp at the capacitive node reaches the sampled peak voltage in each switching cycle. Specifically, in a certain switching cycle, the period of time taken to charge the reference timing capacitor C2 until the voltage Vramp at the capacitive node RAMP to the sampled peak voltage is the reference time. The reference information REF_ST corresponding to the reference time is a high level. Moreover, the reference information REF_ST is pulled low just when the voltage Vramp at the capacitive node RAMP equals to the sampled peak voltage. The reference information REF_ST is again pulled high at the beginning of the next charge circle.

In an additional embodiment, the capacitive node RAMP is further coupled to a switching transistor. A source of the switching transistor is coupled to the capacitive node RAMP, and a drain of the switching transistor is grounded. A gate of the switching transistor is coupled to an output terminal of the control signal generation circuit 120 to receive the control signal PFM. When the power switching transistor Mo in the constant-current drive circuit is turned on by the control signal PFM, said switching transistor is responsively turned on, the voltage at the capacitive node RAMP is pulled low. On the contrary, when the power switching transistor Mo in the constant-current drive circuit is turned off by the control signal PFM, said switching transistor is responsively turned off, the reference timing capacitor C2 is allowed to charge.

With continued reference to FIGS. 3 and 4, after the demagnetization time Tdemag of the inductor L and the reference information REF_ST are both transmitted to the rapid start signal generation module 110, if a time point N2 corresponding to the demagnetization time Tdemag of the inductor L (during the demagnetization of the inductor L, the output information remains a low level) is later than a time point N1 when the reference information REF_ST is pulled low, i.e., if the demagnetization time Tdemag of the inductor L ends later than the ending point of the reference time, then the output rapid start information ST_FAST is a low level (ST_FAST=0). That is, a signal entry into a rapid start phase is generated to indicate that the system enters into the rapid start mode. In a certain switching cycle, a time point N2' corresponding to the demagnetization time Tdemag of the inductor L is earlier than the time point N1 when reference information REF_ST is pulled low. That is, the demagnetization time Tdemag of the inductor L ends earlier than the ending point of the reference time. As a result, the rapid start information ST_FAST is pulled high (ST_FAST=1) to indicate that the system exits from the rapid start mode.

As can be seen from the above description, in this embodiment, the output information OUT_DETECT is not compared with fixed reference information (i.e., the demagnetization time of the inductor is not compared with a fixed reference time). Rather, the reference information REF_ST is generated in real time according to the actual load condition. It can be considered that the reference information REF_ST in the present embodiment is generated based on a combination of the reference resistor RST, the sampled peak voltage and the current control signal PFM. Among these, both the reference resistor RST and the sampled peak voltage can be properly adjusted according to the current actual load condition to accommodate various application scenarios.

Further, the rapid start signal ST_FAST is transmitted to the control signal generation module 120 to additionally modulate the control signal PFM. In this way, based on the control signal PFM, the constant-current drive circuit operates in a desired mode (e.g., the LED drive circuit is controlled to enter into or exit from the rapid start mode at a desired time point and operate at proper parameter values in the rapid start mode).

Accelerated charging of the constant-current drive circuit in the rapid start mode can be accomplished, for example, by means of (1) rapid charging at the output terminal achieved by modulating a duty cycle in the rapid start mode (e.g., through extending the circuit's on-time TON or shortening its off-time TOFF), or increasing the sampled peak voltage; (2) broadening the loop bandwidth and speeding up the loop response; or (3) enlarging the difference between a reference at a input terminal and an initial value at the other input terminal of an op-amp or comparator for stably outputting of IOUT or VOUT, i.e., enlarging the difference Δvos, Δvos=Vreff_CC−Vcs_poss_initial, thus enabling faster ramping of the voltage at the capacitive node COMP of the reference timing capacitor. Specifically, this can be accomplished by raising Vreff_CC or lowering Vcs_poss_initial in the fast charging phase. In the examples described herein, the approach of raising Vreff_CC (an average thereof is equal to VREF*DIM_DUTY) in the fast charging phase is employed.

Here, the structure of the control signal generation module 120 is described first. Specifically, referring to FIG. 2, the control signal generation module 120 includes a constant-current reference voltage generation module 121, a sampling algorithm module 122, a loop control circuit 123, a switch on-time modulator 124 and a logic unit.

An input terminal of the constant-current reference voltage generation module 121 is coupled to a reference voltage Vref and a dimming or speed regulation signal DIM and is adapted to generate a constant-current reference voltage Vref_CC. An output terminal of the constant-current reference voltage generation module 121 is coupled to the loop control circuit 123. An input terminal of the sampling algorithm module 122 is coupled to the sampling terminal CS of the constant-current drive circuit for generating a sampled output voltage Vcs_pos. An output terminal of the sampling algorithm module 122 is also coupled to the loop control circuit 123. The loop control circuit 123 receives the constant-current reference voltage Vref_CC and the sampled output voltage Vcs_pos, and an output terminal of the loop control circuit 123 is coupled to an input terminal of the switch on-time modulator 124. The switch on-time modulator 124 modulates and generates a switch on-time TON based on output information from the loop control circuit 123. An output terminal of the switch on-time modulator 124 is coupled to the logic unit and transmits the switch on-time TON from the switch on-time modulator 124 to the logic unit to adjust the control signal PFM. In this embodiment, the power switching transistor is controlled by the pulse frequency modulation (PFM).

Several non-limiting examples of how the control signal PFM is modulated and generated by the control signal generation module 120 based on the rapid start signal ST_FAST will be set forth below.

In a first approach, the rapid start signal ST_FAST may be input to the constant-current reference voltage generation module 121. The constant-current reference voltage generation module 121 uses the rapid start signal ST_FAST and the dimming or speed regulation signal DIM to modulate and generate the control signal PFM indicating entry into the rapid start mode or normal operating mode. Specifically, the constant-current reference voltage generation module 121 receives the rapid start signal (ST_FAST=0) which indicates entry into the rapid start mode, and generates a constant-current reference voltage which remains a high level (e.g., the generated constant-current reference voltage is always output with a 100% duty cycle). Moreover, the constant-current reference voltage generation module 121 receives the rapid start signal (ST_FAST=1) which indicates exit from the rapid start mode, and generates a constant-current reference voltage according to the dimming or speed regulation signal DIM (e.g., a duty cycle for generating constant-current reference voltage is always output according to a duty cycle of the dimming or speed regulation signal DIM).

Figure 5:
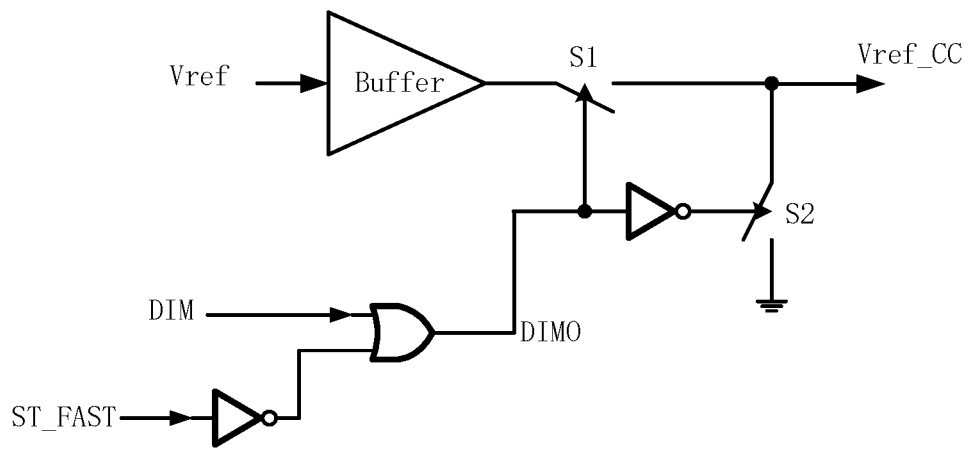
FIG. 5 is a schematic circuit diagram of a constant-current reference voltage generation module in the control circuit according to an embodiment of the present invention.

FIG. 5 is a schematic circuit diagram of the constant-current reference voltage generation module in the control circuit according to an embodiment of the present invention. As shown in FIG. 5, the constant-current reference voltage generation module specifically includes a first inverter, an OR gate, a first switch S1, a second inverter and a second switch S2. An input terminal of the first inverter is adapted to receive the rapid start signal ST_FAST, an output terminal of the first inverter is coupled to a second input terminal of the OR gate. A first input terminal of the OR gate is adapted to receive the dimming or speed regulation signal DIM. An output terminal of the OR gate is coupled to the first switch S1 to control the first switch S1 to be turned on or off. Two terminals of the first switch S1 are coupled respectively to the reference voltage Vref and the output terminal of the constant-current reference voltage generation module 121. As such, when the first switch S1 is turned on, the constant-current reference voltage generation module 121 outputs the constant-current reference voltage which is a high level according to the reference voltage Vref. The output terminal of the OR gate is also coupled to an input terminal of the second inverter, and an output terminal of the second inverter is coupled to the second switch S2 to control the second switch S2 to be turned on or off. Two terminals of the second switch S2 are coupled respectively to a ground terminal and the output terminal of the constant-current reference voltage generation module 121. As such, when the second switch S2 is turned on, the constant-current reference voltage generation module 121 outputs the constant-current reference voltage which is a low level.

Figure 6:
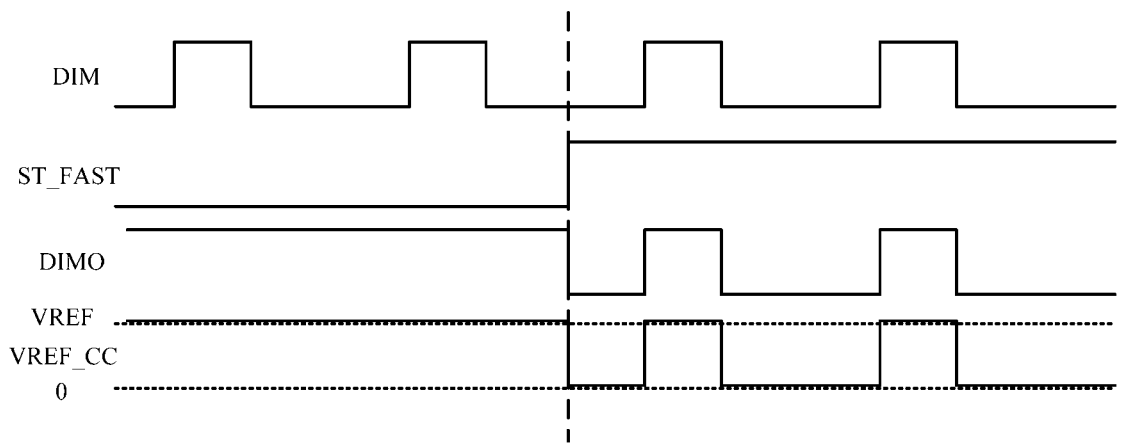
FIG. 6 is a timing diagram for generating a constant-current reference voltage by the constant-current reference voltage generation module in the control circuit based on a rapid start signal according to an embodiment of the present invention.

FIG. 6 is a timing diagram for the generation of the constant-current reference voltage by the constant-current reference voltage generation module in the control circuit based on the rapid start signal according to an embodiment of the present invention. With combined reference to FIGS. 5 and 6, when the rapid start signal ST_FAST=0, i.e., indicating entry into the rapid start mode, the first inverter inverts the rapid start signal ST_FAST and outputs a high level. Thus, a modulated signal DIMO output from OR gate is always a high level to control the first switch S1 to be turned on and the output terminal outputs the constant-current reference voltage which is always a high level, i.e., Vreff_CC=1. That is, in the rapid start mode, (ST_FAST=0), the dimming or speed regulation signal DIM is shielded, and the output voltage is always at the maximum amplitude (i.e., the constant-current reference voltage Vref_CC is always a high level). As a result, even under a dimming or speed regulation condition (e.g., the dimming or speed regulation signal DIM is a high level), particularly at a deep dimming or speed regulation level of, e.g., 1%, the system still operates under 100% dimming or speed regulation. Consequently, an output current from the constant-current drive circuit is much higher than that under 1% dimming or speed regulation. The output capacitor Co is charged by 100% output current, the voltage on the output capacitor Co rises quickly.

Additionally, when the rapid start signal ST_FAST=1, i.e., indicating exit from the rapid start mode and entry into the normal operating mode, the first inverter inverts the rapid start signal ST_FAST and outputs a low level. As a result, the modulated signal DIMO output from the OR gate depends on the dimming or speed regulation signal DIM, and the first switch S1 or the second switch S2 is turned on according to the dimming or speed regulation signal DIM to output constant-current reference voltage Vreff_CC. In the normal operating mode (ST_FAST=1), the constant-current reference voltage Vref_CC can be output according to the dimming or speed regulation signal DIM. For example, when under 1% dimming or speed regulation, the output current will be right at a level appropriate for 1% dimming or speed regulation.

With continued reference to FIG. 5, the constant-current reference voltage generation module further includes a buffer Buffer adapted to buffer the reference signal Vref and output the constant-current reference voltage Vreff_CC. An output terminal of the buffer Buffer is coupled to the first switch S1.

In a second approach, the rapid start signal ST_FAST may be input to the sampling algorithm module 122 to accomplish indirect regulation of the loop control circuit 123.

Specifically, referring to FIG. 2, the loop control circuit 123 includes an error amplifier Gm, a filtering capacitor Ccomp and a comparator circuit. A positive terminal of the error amplifier Gm is adapted to receive the constant-current reference voltage Vref_CC, a negative terminal of the error amplifier Gm is coupled to the output terminal of the sampling algorithm module 122 and adapted to receive the sampled output voltage CS_Pos. Moreover, an output node COMP of an output terminal of the error amplifier Gm is coupled to a first terminal of the filtering capacitor Ccomp, and a second terminal of the filtering capacitor Ccomp is grounded. The output node COMP of the error amplifier Gm is also coupled to the comparator circuit.

Specifically, when the sampling algorithm module 122 receives the rapid start signal indicating entry into the rapid start phase (ST_FAST=0), and generates the sampled output voltage which is a low level. That is, the sampled output signal CS_pos is set to 0 (CS_pos=0), and the output node COMP of the error amplifier Gm remains a high level. As a result, the switch on-time TON output from the switch on-time modulator 124 coupled to the loop control circuit 123 is augmented, leading to an increased output current and a surging output voltage. When the sampling algorithm module 122 receives the rapid start signal indicating exit from the rapid start phase (ST_FAST=1), the system is switched back to the normal operating mode.

In a third approach, the rapid start signal ST_FAST may be directly input to the loop control circuit 123 to accomplish direct regulation thereof. For example, when the loop control circuit 123 receives the rapid start signal indicating entry into the rapid start phase (ST_FAST=0), the loop control circuit 123 outputs a first signal. When receiving the rapid start signal indicating exit from the rapid start phase (ST_FAST=1), the loop control circuit 123 outputs a second signal. In response, the switch on-time modulator 124 modulates and generates the switch on-time according to the first or second signal. The switch on-time TON in a switching cycle modulated and generated according to the first signal is higher than the switch on-time TON in a switching cycle modulated and generated according to the second signal.

For example, the rapid start signal ST_FAST may be input to the error amplifier Gm. When ST_FAST=0, the error amplifier Gm may have an increased equivalent gain, or the filtering capacitor Ccomp may have a reduced equivalent capacitance. As a result, the loop bandwidth Gm/Ccomp is expanded, leading to faster variation at the output node COMP of the error amplifier Gm. Moreover, the first signal is output from the comparator circuit.

As another example, the rapid start signal ST_FAST may be utilized to directly control the comparator circuit so that an output node COMP2 of the comparator circuit can be pulled up beyond a certain value in normal operation. Thus, the switch on-time TON is augmented, resulting in an increased output current and hence a surge of the output voltage.

In a fourth approach, the rapid start signal ST_FAST may be used to control the switch on-time modulator 124 or the logic unit. Specifically, when ST_FAST=0, the switch on-time TON is augmented, or the switch off-time TOFF is reduced, resulting in an increased duty cycle of the generated control signal PFM. In this way, the output current is increased, rapidly raising the output voltage.

Using the control circuit as defined above in a constant-current drive circuit enables targeted determination of a time point for the system to enter into or exit from the rapid start mode according to an actual load condition of the constant-current drive circuit, so as to avoid the problem of easy overshooting or insufficient charging, for example, operation in the rapid start mode for a fixed period of time.

With continued reference to FIGS. 1 and 2, the constant-current drive circuit includes a main circuit and a control circuit 100. The main circuit may be a voltage step-down circuit (e.g., a buck circuit) or a voltage step-up circuit (e.g., a boost circuit). The control circuit 100 is adapted to generate a drive and control logic signal to control switching condition of a power switching transistor Mo in the constant-current drive circuit.

The present embodiment will be explained in the context of the main circuit being implemented as a buck circuit as an example. The buck circuit includes a rectifier circuit, a power switching transistor Mo, an input capacitor C1, a flyback diode Do, an output capacitor Co, an inductor L and an LED load.

With reference to FIG. 2, the rectifier circuit rectifies an input voltage into a DC voltage. A first terminal of the input capacitor C1 is coupled to the rectifier circuit, and a second terminal of the input capacitor C1 is coupled to a reference ground. A cathode of the flyback diode Do is coupled to the first terminal of the input capacitor C1. A first terminal of the output capacitor Co is coupled to the first terminal of the input capacitor C1, and the LED load is connected in parallel to the output capacitor Co. A first terminal of the inductor L is coupled to an anode of the flyback diode Do, and a second terminal of the inductor L is coupled to a second terminal of the output capacitor Co. A gate of the power switching transistor Mo is coupled to the control circuit 100, and a drain of the power switching transistor Mo is coupled to the first terminal of the inductor L.

Specifically, when the power switching transistor Mo is turned on, the input voltage Vin charges the output capacitor Co through the power switching transistor Mo and thus provides the LED load with energy. When the power switching transistor Mo is turned off, energy stored in the inductor L can be delivered to the output terminal via the flyback diode Do, thus maintain a stable output voltage Vout. Switching condition of the power switching transistor Mo is controlled by the control circuit 100.

Operation of the constant-current drive circuit in the present embodiment involves, for example, detecting output information OUT_DETECT of the constant-current drive circuit (more precisely, a demagnetization time of the inductor L) and comparing it with reference information REF_ST generated by the reference information generation module TST. If the demagnetization time ends later than a ending point of the reference time of the reference information REF_ST, the system is kept in the rapid start mode where the output capacitor Co is charged with a large current to rapidly raise the output voltage Co in order to effectively shorten a start time of the constant-current drive circuit. If the demagnetization time end earlier than a ending point of the reference time of the reference information REF_ST, the system exits from the rapid start mode where the output capacitor Co is charged with a relatively small current by a close-loop control mode so that the constant-current drive circuit slowly and gradually reaches a predetermined output voltage and/or output current. It can effectively address the requirements on dimming performance of the constant-current drive circuit.

It is to be noted that while the present invention has been described with reference to several preferred embodiments, the forgoing embodiments are not intended to limit the invention. In light of the teachings hereinabove, any person familiar with the art may make various possible variations and changes to the disclosed embodiments or modify them into equivalent alternatives, without departing from the scope thereof. Accordingly, any and all such simple variations, equivalent alternatives and modifications made to the foregoing embodiments without departing from the scope of the invention are intended to fall within the scope thereof.

It is to be understood that, as used herein, the terms "first", "second", "third" and the like are only meant to distinguish various components, elements, steps, etc. from each other rather than indicate logical or sequential orderings thereof, unless otherwise indicated or specified.

Further, it is also to be recognized that the terminology used herein is for the purpose of describing particular embodiments only, and is not intended to limit the scope of the present invention. It must be noted that as used herein and in the appended claims, the singular forms "a" and "an" include the plural reference unless the context clearly indicates otherwise. Thus, for example, a reference to "a step" or "a means" is a reference to one or more steps or means and may include sub-steps and sub-means. All conjunctions used are to be understood in the most inclusive sense possible. Thus, the term "or" should be understood as having the definition of a logical "or" rather than that of a logical "exclusive or" unless the context clearly necessitates otherwise.

What is claimed is:
1. A control circuit for a constant-current drive circuit, comprising:
  an output information detection module coupled to an output terminal of the constant-current drive circuit and configured to detect output information at the output terminal of the constant-current drive circuit;
  a reference information generation module coupled to an output current sampling terminal of the constant-current drive circuit and configured to generate reference information based on a sampled peak output current of the constant-current drive circuit;
  a rapid start signal generation module having an input terminal coupled to output terminals of the output information detection module and the reference information generation module and configured to receive the output information and the reference information and generate a rapid start signal configured to indicate whether it enters into a rapid start phase or exits from a rapid start phase; and a control signal generation module having an input terminal coupled to an output terminal of the rapid start signal generation module and configured to receive the rapid start signal and generate a control signal according to the rapid start signal, the control signal configured to control a power switching transistor in the constant-current drive circuit to drive a load.

2. The control circuit for a constant-current drive circuit as claimed in claim 1, wherein the output information detection module is an inductor demagnetization detection module configured to detect a demagnetization time of an inductor in the constant-current drive circuit.

3. The control circuit for a constant-current drive circuit as claimed in claim 2, wherein the reference information is a reference time which characterizes a period of time taken to charge a reference timing capacitor with a predetermined reference current until a voltage at a capacitive node of the reference timing capacitor reaches a sampled peak voltage of the constant-current drive circuit, and where if the demagnetization time ends later than the ending point of the reference time, the rapid start signal generation module continues generating the rapid start signal, or if the demagnetization time ends earlier than the ending point of the reference time, the rapid start signal generation module inverts the level of the rapid start signal and causes exit from the rapid start phase at the ending point of the demagnetization time.

4. The control circuit for a constant-current drive circuit as claimed in claim 3, wherein the rapid start signal generation module comprises:

an AND gate having two input terminals coupled respectively to the output terminal of the output information detection module and the output terminal of the reference information generation module; and a latch, the latch having an input terminal coupled to an output terminal of the AND gate, an output terminal of the latch outputs the rapid start signal.

5. The control circuit for a constant-current drive circuit as claimed in claim 1, wherein the reference information generation module comprises:

a reference current source, the reference current source coupled to a reference resistor and configured to generate a reference current corresponding to the reference resistor, the reference current source having an output terminal coupled to a reference timing capacitor and configured to charge the reference timing capacitor;

a sample-and-hold circuit having an input terminal coupled to the output current sampling terminal of the constant-current drive circuit and configured to generate the sampled peak output current;

a first comparator, the first comparator having a negative terminal coupled to a capacitive node of the reference timing capacitor, the first comparator having a positive terminal coupled to an output terminal of the sample-and-hold circuit and configured to output comparison information;

an inverter having an input terminal coupled to an output terminal of the first comparator and configured to invert the comparison information from the first comparator and output the inverted information; and a NOR gate, the NOR gate having a first input terminal coupled to an output terminal of the inverter, the NOR gate having a second input terminal configured to receive a current control signal from the control circuit and output the reference information.

6. The control circuit for a constant-current drive circuit as claimed in claim 5, wherein the reference information generation module further comprises a switching transistor having a source coupled to the capacitive node of the reference timing capacitor, a grounded drain and a gate coupled to an output terminal of the control signal generation module and configured to receive the control signal.

7. The control circuit for a constant-current drive circuit as claimed in claim 1, wherein the control signal generation module is configured to receive the rapid start signal and a dimming or speed regulation signal and generate a constant-current reference voltage, which is output with a duty cycle of 100% if the received rapid start signal indicates entry into the rapid start phase, or with a duty cycle depending on a duty cycle of the dimming or speed regulation signal if the received rapid start signal indicates exit from the rapid start phase.

8. The control circuit for a constant-current drive circuit as claimed in claim 7, wherein the control signal generation module comprises:

a constant-current reference voltage generation module having an input terminal configured to receive the reference voltage and the dimming or speed regulation signal and generate the constant-current reference voltage;

a sampling algorithm module having an input terminal coupled to the output current sampling terminal of the constant-current drive circuit and configured to generate a sampled output current;

a loop control circuit coupled to an output terminal of the constant-current reference voltage generation module and an output terminal of the sampling algorithm module; and a switch on-time modulator having an input terminal coupled to an output terminal of the loop control circuit and configured to modulate and generate a switch on-time in a switching period according to output information from the loop control circuit.

9. The control circuit for a constant-current drive circuit as claimed in claim 8, wherein the constant-current reference voltage generation module comprises:

a first inverter, the first inverter having an input terminal configured to receive the rapid start signal which indicates entry into the rapid start phase when the rapid start signal is a low level and indicates exit from the rapid start phase when the rapid start signal is a high level;

an OR gate, the OR gate having a first input terminal configured to receive the dimming or speed regulation signal, the OR gate having a second input terminal coupled to an output terminal of the first inverter, the OR gate having an output terminal coupled to a first switch so as to be able to turn the first switch on or off; and a second inverter, the second inverter having an input terminal coupled to the output terminal of the OR gate, the second inverter having an output terminal coupled to a second switch so as to be able to turn the second switch on or off, wherein two terminals of the first switch are coupled respectively to an input terminal of a reference voltage and the output terminal of the constant-current reference voltage generation module, and two terminals of the second switch are respectively grounded and coupled to the output terminal of the constant-current reference voltage generation module.

10. The control circuit for a constant-current drive circuit as claimed in claim 8, wherein the sampling algorithm module is further configured to receive the rapid start signal, and wherein when the received rapid start signal indicates entry into the rapid start phase, a sampled output voltage corresponding to the sampled output current is a low level.

11. The control circuit for a constant-current drive circuit as claimed in claim 8, wherein the loop control circuit is further configured to receive the rapid start signal and output a first signal if the received rapid start signal indicates entry into the rapid start phase, or output a second signal if the received rapid start signal indicates exit from the rapid start phase, and
  wherein the switch on-time in a switching period modulated and generated by the switch on-time modulator according to the first signal is higher than the switch on-time in a switching period modulated and generated by the switch on-time modulator according to the second signal.

12. The control circuit for a constant-current drive circuit as claimed in claim 11, wherein the loop control circuit comprises:
  an error amplifier, the error amplifier having a positive terminal configured to receive the constant-current reference voltage, the error amplifier having a negative terminal configured to receive the sampled output voltage corresponding to the sampled output current, the error amplifier having an output terminal coupled to an output node;
  a filtering capacitor, the filtering capacitor having a first terminal coupled to the output node, the filtering capacitor having a grounded second terminal; and
  a comparator circuit, the comparator circuit having an input terminal coupled to the output node, the comparator circuit having an output terminal coupled to the input terminal of the switch on-time modulator.

13. The control circuit for a constant-current drive circuit as claimed in claim 12, wherein the error amplifier is further configured to receive the rapid start signal, and wherein when the received rapid start signal indicates entry into the rapid start phase, an equivalent gain of the error amplifier is increased, or an equivalent capacitance of the filtering capacitor is reduced, so that accelerated variation is created at the output node and the first signal is output by the comparator circuit.

14. The control circuit for a constant-current drive circuit as claimed in claim 8, wherein the switch on-time modulator is further configured to receive the rapid start signal, and wherein when the received rapid start signal indicates entry into the rapid start phase, the switch on-time is increased, or a switch off-time is reduced.

15. A constant-current drive circuit comprising a main circuit and the control circuit as defined in claim 1.

16. The constant-current drive circuit as claimed in claim 15, wherein the main circuit is a buck circuit or a boost circuit.

* * * * *